Oct. 7, 1930.   C. A. BREWER   1,777,391
APPARATUS FOR SOIL TREATMENT
Filed Aug. 6, 1924   3 Sheets-Sheet 2
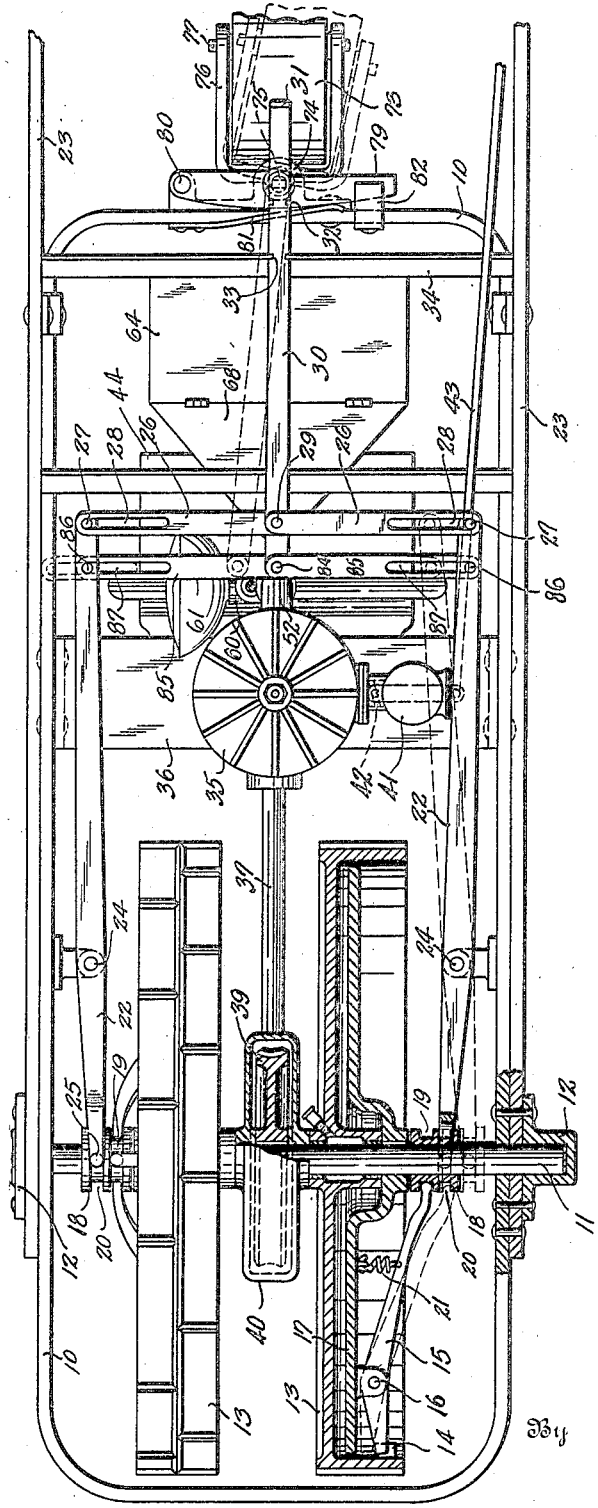
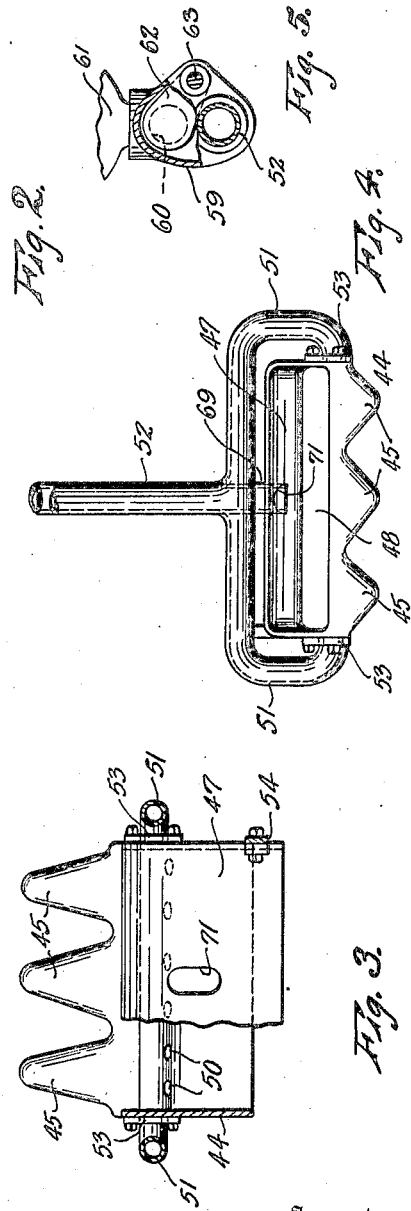
Inventor
Charles A. Brewer
By Wooster & Davis
Attorneys.

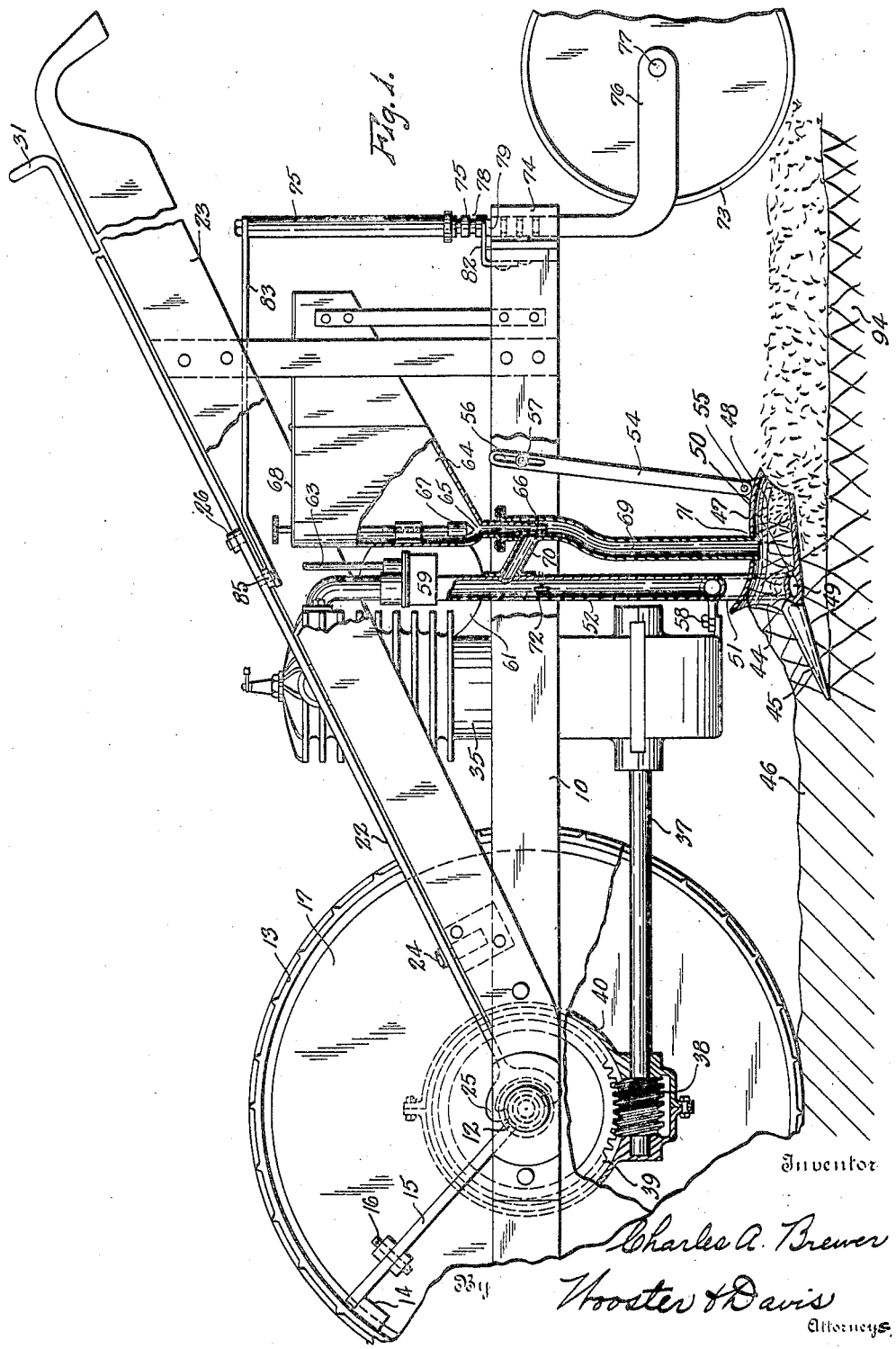

Oct. 7, 1930.  C. A. BREWER  1,777,391
APPARATUS FOR SOIL TREATMENT
Filed Aug. 6, 1924  3 Sheets-Sheet 3
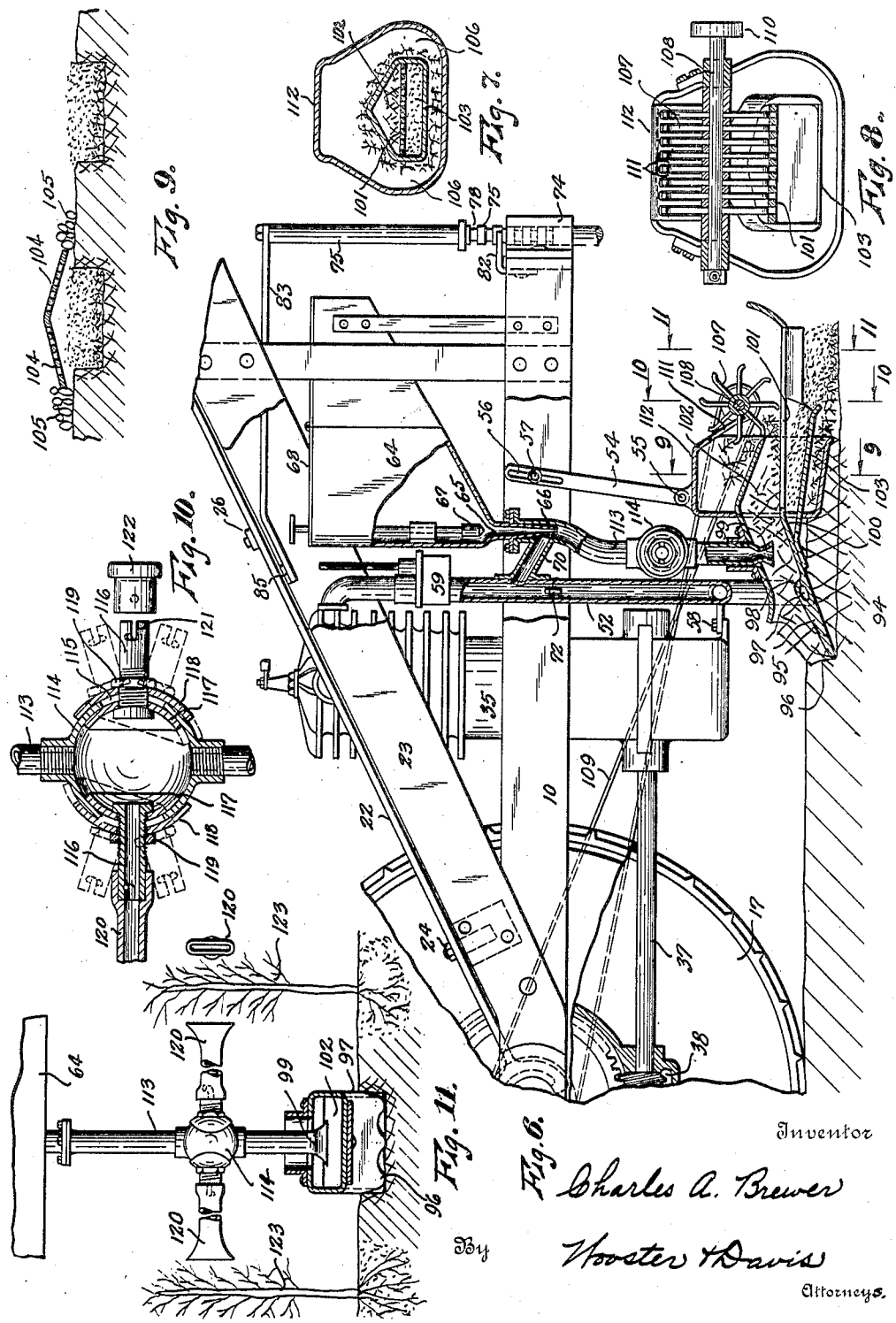

Patented Oct. 7, 1930

1,777,391

UNITED STATES PATENT OFFICE

CHARLES A. BREWER, OF NOROTON HEIGHTS, CONNECTICUT

APPARATUS FOR SOIL TREATMENT

Application filed August 6, 1924. Serial No. 730,347.

This invention relates to a process and apparatus for treating soil for tillage purposes, and has for an object to provide an improved device which may be operated in a manner similar to the soil cultivators now generally employed, but which will have a much more beneficial effect on the soil than the ordinary cultivators thus greatly increasing the plant growth and yield, and which may also be used to at the same time thoroughly incorporate soil treating compounds with the soil, for example, fertilizers, insecticides and so forth.

It is a further object of the invention to provide a device for carrying out these operations which will be simple in construction and reliable in operation, and which will treat an extensive area in a minimum of time.

With the foregoing and other objects in view, I have devised the device illustrated in the accompanying drawings forming a part of this specification, similar reference characters being employed throughout the various figures to indicate corresponding elements, though it will be understood that other forms and constructions of devices may be employed to carry out my invention. In these drawings, Fig. 1 is a side elevation of an improved device embodying my invention, parts of the device being in section to more clearly disclose the construction.

Fig. 2 is a top plan view thereof with parts shown in section.

Fig. 3 is a partial plan view and a partial section of the tool for treating the soil.

Fig. 4 is a front elevation thereof.

Fig. 5 is a detail of the control for the shattering effect.

Fig. 6 is a view similar to Fig. 1 showing a somewhat different construction.

Fig. 7 is a detail section substantially on line 9—9 of Fig. 6.

Fig. 8 is a section substantially on line 10—10 of Fig. 6.

Fig. 9 is a section substantially on line 11—11 of Fig. 6.

Fig. 10 is a detail section of the connection for the spray devices, and

Fig. 11 is a transverse section through the soil lifting device of Fig. 6 showing the spray devices in elevation.

It has been found in soil treatment that the more thoroughly the soil is broken up and aerated the greater will be the plant growth and also the greater the yield. This desired result is also greatly increased by breaking up or loosening the subsoil which facilitates the penetration of moisture and allows the roots to run down deeper. It has further been found that this desired breaking up and loosening of the soil may be effectively secured by means of an explosion within the soil either, by exploding an explosive within the soil or by exploding it outside the soil and discharging the gases from the explosion into the soil under high pressure so that the effect of the explosion will shatter the soil thoroughly loosening and breaking it and at the same time cracking or loosening the subsoil. In my present invention I have devised a device which will thoroughly shatter and loosen the soil by means of a succession of explosions, and it is so constructed that it may be employed in a manner similar to the use of an ordinary cultivator, but which will furnish its own power for the cultivating operation, as by means of an internal combustion motor, and at the same time will utilize the explosive forces of the exhaust from the motor for exploding or shattering the soil.

I also employ the explosive force of the gases from the motor to thoroughly incorporate soil treating compounds with the soil, for example, fertilizers, insecticides or similar substances, which not only thoroughly mixes the substances with the soil but drives them or projects them at a high velocity into the soil so that they are thoroughly incorporated with it, this action being in contrast to the mere spraying of the substances on the soil. The effect is similar to shooting them or exploding them into the soil.

Referring to the accompanying drawings the device comprises a frame 10 which carries the various elements of the apparatus. The frame in the present instance is composed of a rectangular bar of metal bent to form a substantially rectangular frame. Such a frame is very simple to manufacture and is strong and rigid with a comparatively light weight. Mounted between the sides of the frame at the forward end thereof is a transverse shaft 11 having bearings 12 carried by the frame, and loosely mounted on the shaft is a pair of drive wheels 13. These wheels are independently mounted on the shaft and may rotate on the shaft independently of each other, but may be rigidly connected to rotate with the shaft by a suitable clutch mechanism. I have illustrated a simple and effective mechanism for this purpose. On the under side of the rim of the wheel is provided one or more lugs 14 adapted to engage one end of a lever 15 pivoted at 16 to a disc or plate 17 which is keyed to the shaft 11. Slidably mounted on the shaft is a collar 18 having circumferential grooves 19 and 20. In one of these grooves, as 19, the other end of the lever 15 projects, so that as the collar is slid outwardly on the shaft away from the disc to the dotted line position shown in Fig. 2 the other end of the lever 15 will be drawn out of the path of movement of the lug 14, thus disconnecting the drive wheel from the shaft. A suitable spring 21 is provided tending to move the end of the lever into the path of movement of the lug to engage this lug and drive the wheel. A similar clutch mechanism is provided for the other wheel, so that they are driven independently of each other. The collar 18 may be shifted on the shaft to control the position of the clutch lever by means of a lever 22 pivoted to the handles 23 at 24, which lever is provided with a fork 25 having shoes projecting into the grooves 20. At their free ends the levers 22 are connected to lines 26 by a pin and slot connection 27 and 28, and at their inner ends are pivoted at 29 to a rod 30 extending to a position where it may be manipulated by the operator, the free end of this rod being preferably provided with a suitable handle 31 so that the rod may be either pushed in to break the toggle formed by links 26 and release both clutches in the drive wheels simultaneously, or may be drawn rearwardly to allow the clutches to be thrown to driving position by the springs 21. The rod is preferably provided with suitable notches 32 forming reduced portions adapted to seat in a notch 33 in cross bar 34 forming a brace between the handles 23. The coaction of these notches will hold the rod in positions to cause the clutches to drive the machine or allow the motor to run idle.

The device is driven by a suitable internal combustion motor, preferably a gasoline motor, 35 mounted on a suitable support 36 extending between the sides of the frame. This motor drives a shaft 37 carrying a worm 38 meshing with a worm gear 39 keyed to the shaft 11, preferably at a point between two drive wheels, so that the shaft is driven from the motor by a positive drive. The worm and worm gear are enclosed in a suitable casing 40 to keep them free of dust and dirt and also to facilitate lubrication. The usual carburetor for the motor is shown in outline at 41, and this carburetor is supplied in the usual manner with fuel from a supply tank, not shown, but which may be mounted in any suitable position on the device, I have also not shown in the drawings the usual ignition device, such as a magneto. The throttle valve 42 is controlled by a rod 43 extending to a position easily accessible for manipulation by the operator.

The explosive forces of the exhaust gases from the motor are employed to thoroughly shatter the soil and thus thoroughly loosen and break it up and leave it in a fine loose condition. The explosive forces of these gases may also be employed to project or drive fertilizers, insecticides or other soil treating compounds at a high velocity into the soil so that they are thoroughly incorporated therewith. Carried by the frame is a tool 44 which I term a plow as it is drawn through the soil to loosen it and carry it to a position where it may be acted upon by the exhaust gases to thoroughly shatter it and break it up into a fine loose condition. This plow is provided with a number of prongs or teeth 45 projecting forwardly under the top surface of the soil 46, as shown in Fig. 1, and at the rear ends of these prongs is a baffle plate 47 spaced above these rear ends and connected to them at the opposite ends of the plow, as shown in Fig. 4, so that there is really formed a passage 48 through the tool for the soil which will be loosened and lifted by the prongs. At the rear ends of the prongs at the lower side of the passage 48 and extending throughout the length of the tool, is a passage 49 for the exhaust gases from the motor, and this passage is provided with a suitable number of discharge openings 50 directed upwardly and rearwardly into the passage 48, as shown in Fig. 1. At its opposite end the passage 49 is connected to suitable branch pipes 51 of the exhaust pipe 52 leading from the motor, and the connection 53 from these branch pipes to the plow 44 are suitable swivel connections to allow the plow to be tilted so as to regulate the inclination of the prongs or teeth 45 to vary the depth of the soil to be treated. A convenient device for adjusting the inclination of these prongs is shown in Fig. 1, and comprises a bar 54 pivoted at 55 to the rear portion of the plate 47 having a slot 56 for the passage of a clamping bolt 57 carried by the frame. It will be apparent that by loosening this bolt the inclination of the prongs or teeth 45 may be adjusted to vary the depth of the soil treated, and it may be secured in adjusted position. To give added strength and rigidity to the support for the plow the exhaust pipe may be tied to the lower end of the motor casing, as shown at 58, Fig. 1.

The shattering effect of the exhaust from the motor may be controlled by suitable valve mechanism. For this purpose a casing 59 is mounted in the exhaust pipe and has a branch 60 discharging to the atmosphere as through a muffler 61. The branch of the exhaust pipe leading to the plow and the branch 60 may be controlled by a valve 62. This valve may be operated by a rod 63 connected by any suitable mechanism, not shown, to a handle in position to be easily manipulated by the operator, and it will be apparent that by adjusting this valve the proportion of the exhaust gases fed to the plow may be adjusted as desired.

For the purpose of feeding fertilizers, insecticides or other soil treating compounds to the soil, either in powdered or liquid form, a tank 64 is provided having a discharge opening 65 leading to a nozzle 66, and the discharge opening is controlled by a suitable adjustable valve 67. The tank has a filling opening in the top closed by a suitable hinged cover 68. The nozzle 66 is located in a pipe 69 connected to the exhaust pipe 52 by a connection 70, which preferably discharges into the pipe 69 just above the outlet from the nozzle. The lower end of the pipe 69 is extended through an opening 71 in the baffle plate 47 and terminates at a short distance below this plate in the passage 48 for the soil to be treated. The opening 71 is sufficiently larger than the pipe 69 to allow for the tilting adjusting movements of the plow. Below the connection of the branch 70 to the exhaust pipe 52 is a valve 72 which may be adjusted by any suitable means to control the amount of the exhaust gases which will be by-passed through the pipe 69. Thus the explosive force of the exhaust gases from the motor which drives the device is used to shatter the soil and also to drive or project fertilizers, insecticides or other soil treating compounds into the shattered soil at a high velocity so that they are thoroughly incorporated therewith.

Means is provided to maintain the proper depth for the plow and also to vary the depth of this plow in the soil. For this purpose a wheel or caster 73 is mounted at the rear end of the frame. Secured to the frame is an upright bearing 74 in which the pin 75 may turn, this pin being connected to a fork 76 embracing the wheel 73 carrying a shaft 77 for the wheel. The pin 75 is provided with spaced grooves 78 adapted to seat in a notch in one side of the pivoted catch 79. This catch is pivoted at 80 to the frame and is held in securing position by a spring 81, a suitable stop 82 being provided to limit the outward movements of this catch. It will be apparent by this means the height of the wheel 73 may be adjusted to vary the amount to which the plow will project into the soil.

In order to do away with the necessity of providing a differential between the two drive wheels 13 means may be provided operated by a laterally swinging movement of the wheel 73 to throw out the clutch of one of the wheels, preferably the inner one, as the rear end of the device is swung laterally to turn corners. A device is shown, somewhat diagrammatically, for this purpose. For example, the pin 75 may be projected upwardly and have rigidly attached to the top thereof a bar 83 pivoted at 84 to a pair of links 85, which links have pin and slot connections 86 and 87 with the clutch operating levers 22. If for instance the operator swings the rear end of the machine to the right to make a left hand turn the wheel 73 may be swung to the dotted line position shown in Fig. 2, which will swing the bar 83 drawing inwardly the free end of the left hand lever 22 to the dotted line position shown in Fig. 2 through the left link 85, and will throw out the clutch on the left hand or inner drive wheel 13 until the device is substantially straightened out when the clutch will again be thrown in by the spring 21. If the right hand turn is made the wheel 73 will be swung in the opposite direction, throwing out the clutch in the right hand drive wheel.

In operation the motor through the drive wheels draws the plow through the soil which loosens and lifts the soil, and then the explosive force of the exhaust gases from this motor are used to thoroughly shatter the soil by discharging them into the soil to leave the soil in a fluffy, loose and thoroughly aerated condition. In the form of device shown in Fig. 1 the gases are discharged under the soil after it has been loosened, and the plate 47 prevents the soil from being blown into the mechanism or into the air by the force of the explosions. As the soil is shattered or broken up, or a short time thereafter, the soil treating compounds are projected at a high velocity into the shattered soil through the pipe 69 so as to be thoroughly intermingled and incorporated with the soil. The force of the explosive blows of the exhaust gases will also loosen or crack the subsoil 94 facilitating the penetration of moisture and encouraging the roots of plants to run deeper. Thus the soil is thoroughly broken up or shattered and may be treated with any desired compound in one continuous operation and is left in a thoroughly shattered, loose condition which will greatly stimulate plant growth and increase the yield. The carbon dioxide, steam and other compounds of carbon, nitrogen and oxygen produced by the burning of the gases within the motor are thoroughly mixed with the soil further stimulating plant growth and also destroying pests in the soil by destroying the pests themselves, their eggs and larvæ. If water is fed from tank 64 it is vaporized or converted into steam by the heat of the exhaust gases. Steam is very effective in destroying pests in the soil.

In Figs. 6 to 11 I have shown a device for carrying out the same functions as the device of Fig. 1, but with means provided for performing additional functions. In this device the soil is loosened and broken up by the exhaust gases from the motor and may be treated with insecticides or other soil treating compounds from the reservoir 64, but further means is provided for sifting or screening the soil to remove stones, weeds, and other large particles to leave the soil in a fine loose fluffy condition. Means is also provided for depositing the weeds or other plants in the bottom of the furrow and depositing the fine treated soil on top thereof to cause them to thoroughly decay and provide humus for the soil. Means is still further provided for using the exhaust gases from the motor for projecting insecticides or other compounds in the form of sprays either in the liquid or powdered form against the foliage of the plants at a high velocity.

As shown in Figs. 6 to 11 a plow 95 is similar to that shown in Fig. 1 except the teeth 96 are shown as somewhat shorter, although this is, of course, a question of degree. This plow is provided with a transverse passage 97 corresponding to the passage 49 in the form shown in Fig. 1, and is connected to the exhaust pipe 52 in the same manner. It has a series of discharge openings 98 inclined upwardly and rearwardly to discharge the gases into the soil as it passes over the same to thoroughly shatter this soil and break it up. A nozzle 99 projects through the top 100 for the purpose of discharging insecticides or other soil treating compounds into the soil corresponding to the pipe 69 in Fig. 1. These compounds are supplied from the reservoir 64 through the nozzle 66 the same as in the first form. To the rear of this discharge nozzle is a screen 101 which receives the soil after it has passed through a passage 102 for screening the soil and separating the large particles such as stones, sod, weeds and the like from the fine soil. The fine soil passes through the screen and is caught by the wall 103 which carries it rearwardly and deposits it in the trench formed by the plow. At its rear end the screen is inclined laterally, as shown at 104, in Fig. 9 to discharge the stones, indicated at 105, or other large objects which are not broken up during this treatment of the soil, on opposite sides of the furrow or trench where they may be later gathered and carted off. Above the screen is located a device for separating and picking up any weeds or other plants and discharging them into a chute 106 which conducts them to a point beneath the wall 103 and discharges them into the bottom of the furrow in front of the discharge from the wall 103, as shown in Fig. 6. The fine dirt from the wall 103 is thus deposited on these plants and they are covered where they will decay and provide humus for the soil, at the same time they are destroyed. For separating these plants a series of fingers 107 are mounted on a rotating shaft 108 which is rotated from the driving means of the mechanism as by a chain or belt 109 passing over the pulley 110. A series of fingers 111 carried by the upper wall 112 project between these fingers as they rotate to strip these plants from the fingers and to prevent their being carried over to the rear part of the screen.

By this construction and arrangement it will be apparent that the soil is not only thoroughly shattered by the exhaust gases from the motor and treated with soil treating compounds but it is also screened to separate stones or any large particles, which is necessary especially where the soil is to be used for market gardening. The exhaust from the motor continuously vibrates the plow and screen so that the soil will properly pass through the same without any other vibrating device for the screen being required. As indicated in Fig. 9 a strip of soil may be thoroughly prepared for cultivation by one passage of the machine. This is especially valuable for getting crops in at the proper time when the soil and weather conditions are most suitable. That is, a strip may be thoroughly prepared for sowing the seed or setting the plants without the necessity of waiting for the entire field to be plowed, harrowed, and prepared. After the seed has been sown or the plants set in these prepared furrows the machine may later be passed between the rows to prepare the soil between the furrows. This can be done at any time after the rush of planting is over.

I have also provided means whereby the exhaust from the motor may be employed to project insecticides or other compounds against the foliage or stems of the plants, either at the same time as treating the soil or as a separate operation. For this purpose I mount a suitable connection for separate spray nozzles in the pipe 113 from the reservoir 64. A convenient connection is the substantially spherical member 114 having openings 115 in the sides thereof. Pipes 116 have concavo-convex plates 117 and 118 secured thereto and engaging opposite sides of the walls of the spherical member. These plates are clamped against the wall as by a suitable nut 119 and will hold the pipe 116 in different angular positions, the plates frictionally engaging the walls to do this. The spray nozzles 120 are connected to these pipes by suitable detachable joints as a bayonet joint 121. When not in use these may be removed and the pipes closed by suitable closure caps 122. It will be apparent that by the use of these nozzles insecticides either in liquid or powdered form may be projected against plants indicated at 123, while the soil between the plants may be treated and broken up, or this operation may be performed as a separate and distinct operation as desired. By using suitable extensions for the nozzles it may be used for spraying or dusting trees or other large plants, though in such instances the machine will probably be stopped adjacent the tree and the motor run for this purpose.

It is the tendency of the modern practice to get away from the liquid sprays and to use insecticides or similar compounds in the powdered form, as it has been found to be equally if not more effective and is easier and cheaper to handle, besides requiring less material for a given area. By using the exhaust gases of the motor as the projecting force for these compounds they are projected at a high velocity against the branches and leaves and are better retained than where they are merely blown under a blast of air. That is, the compounds are, you might say, in effect shot against the foliage. In using the dry powders with the ordinary projecting apparatus a considerable amount of some calcining substance is generally required to cause the powder to stick to the foliage. With this device the amount of this calcining substance required is reduced or even eliminated.

Having thus set forth the nature of my invention, what I claim is:

1. In a soil treating device, a member for loosening the soil, means for moving the member horizontally through the soil including an internal combustion motor, means for progressively introducing a portion of the exhaust gases from the motor under pressure into the soil beneath the surface thereof closely adjacent the member to shatter the soil, means for introducing another portion of the exhaust gases under pressure into the shattered soil, and means for introducing a soil treating compound into the latter portion prior to its introduction into the soil.

2. In a soil treating device, a member for loosening the soil, means for moving the member horizontally through the soil including an internal combustion motor, an exhaust pipe leading from the motor and having a substantially unrestricted outlet discharging directly into the loosened soil beneath the surface thereof, a container for a soil treating compound, a nozzle in the exhaust pipe, and a connection from said container to said nozzle to conduct the compound thereto.

3. In a soil treating device, a plow having a plurality of prongs directed forwardly, a transverse passage adjacent the rear ends of the prongs and provided with discharge openings, a baffle above said discharge openings, means for passing the plow through the soil including an internal combustion motor, and means for conducting exhaust gases from the motor to said passage.

4. In a soil treating device, a plow having a body provided with a transverse passage having lateral discharge openings, prongs extending forwardly from the body, a baffle plate above said discharge openings, means for moving the plow through the soil including an internal combustion motor, a container for a soil treating compound, discharge pipes for exhaust gases leading from the motor to said passage and the under side of the baffle respectively, and a conducting means from said container to one of said exhaust pipes to introduce the soil treating compound therein.

5. In a soil treating device, means for progressively introducing into the soil beneath the surface thereof a fluid in an expanding state and under a pulsating pressure to break up the soil, and means for progressively introducing into the broken soil a similar fluid in an expanding state under a pulsating pressure and laden with a soil treating compound including a conductor for the gases having a substantially unrestricted discharge opening beneath the surface of the soil so that the compound is forcefully driven throughout the soil by the gases.

6. In a soil treating device, a plow for loosening and shifting the soil, means for progressively introducing a fluid under a rapidly pulsating pressure and in an expanding state into the soil beneath the surface thereof while it is being operated upon by said plow and with the requisite suddenness to shatter the soil, and means for introducing into the shattered soil a similar fluid in an expanding state under a rapidly pulsating pressure and laden with a soil treating compound including a conductor for the gases having a substantially unrestricted discharge opening beneath the soil surface so that the compound is forcefully driven throughout the soil by the gases.

7. In a soil treating device, a member for loosening the soil, means for moving the member horizontally through the soil including an internal combustion motor, means for progressively introducing exhaust gases from the motor into the soil beneath the surface thereof adjacent said member under sufficient pressure to shatter the soil including a gas conductor having a substantially unrestricted outlet beneath the soil surface, and means for introducing a soil treating compound into said gases prior to their introduction into the soil so that the compound is forcefully driven by the gases throughout the soil.

8. In a soil treating device, a member for loosening the soil, means for moving the member horizontally through the soil including an internal combustion motor, means for progressively introducing exhaust gases from the motor into the loosened soil beneath the surface thereof with sufficient pressure to shatter the soil, and means for introducing into the shattered soil exhaust gases from the motor under pressure and laden with soil treating compounds including a conductor for the gases having a substantially unrestricted outlet beneath the soil surface so that the compound is forcefully driven throughout the soil by the gases.

9. In a soil treating device, a member projecting into the soil and provided with a substantially unrestricted discharge opening beneath the soil surface, means for discharging through said opening exhaust gases from an internal combustion motor under sufficient pressure to shatter the soil, and means for feeding to said gases a soil treating compound to be driven through the shattered soil by the action of said gases.

10. In a soil treating device, a member projecting into the soil for breaking and loosening the soil and provided with a substantially unrestricted discharge opening beneath the soil surface, means for discharging fluid through said opening into the soil with the requisite suddenness to shatter the soil, and means for feeding a soil treating compound into said fluid so that it is forcefully driven throughout the loosened soil by said fluid.

11. In a soil treating device, means for progressively functioning an explosive fluid in separate charges, means for introducing a soil treating compound into the resultant gases, means projecting into the soil provided with a passage having a substantially unrestricted outlet opening beneath the soil surface, and means for delivering the mixture of gases and soil treating compound to said passage under pressure in an expanding state to forcefully drive the compound throughout the soil.

12. In a soil treating device, means for progressively introducing into the soil beneath the soil surface a fluid under pressure in an expanding state with the requisite suddenness and pressure to shatter the soil, means projecting into the shattered soil having a passage with a substantially unrestricted discharge outlet, means for progressively introducing into said passage a fluid in an expanding state under a pulsating pressure, and means for introducing into said latter fluid a soil treating compound to be forcefully driven throughout the shattered soil by said fluid.

13. In a soil treating device, means for progressively loosening the soil, means for progressively introducing into the loosened soil beneath the surface thereof a fluid in an expanding state under a rapidly pulsating pressure, and means for introducing into said fluid a soil treating compound to be forcefully driven throughout the loosened soil by said fluid.

In testimony whereof I affix my signature.

CHARLES A. BREWER.